United States Patent [19]

Akeley

[11] 4,046,010
[45] Sept. 6, 1977

[54] PRESSURE TRANSDUCER WITH WELDED TANTALUM DIAPHRAGM

[75] Inventor: Lloyd Thomas Akeley, Fullerton, Calif.

[73] Assignee: Beckman Instruments, Inc., Fullerton, Calif.

[21] Appl. No.: 741,323

[22] Filed: Nov. 12, 1976

[51] Int. Cl.$^2$ .............................................. G01L 7/08
[52] U.S. Cl. .................................. 73/406; 29/157 R; 29/454; 73/398 R; 73/407 R
[58] Field of Search ................. 73/407 R, 406, 398 R; 92/98, 102; 29/454, 157 R; 228/263

[56] References Cited

U.S. PATENT DOCUMENTS

| | | | |
|---|---|---|---|
| 3,072,150 | 1/1963 | Hastings et al. | 92/98 R |
| 3,239,827 | 3/1966 | Werner et al. | 73/407 R |
| 3,324,727 | 6/1967 | Smith et al. | 73/407 R |

*Primary Examiner*—Donald O. Woodiel
*Attorney, Agent, or Firm*—Robert J. Steinmeyer; Paul R. Harder; Donald A. Streck

[57] ABSTRACT

A pressure transducer and method of manufacture is disclosed wherein a tantalum diaphragm is held in position in a pressure transducer by sandwiching the tantalum diaphragm between a stainless steel weld ring and the stainless steel body of the pressure transducer. The stainless steel weld ring is welded to the stainless steel body at a temperature above the melting point of the stainless steel but below the melting point of the tantalum whereby simultaneous to the welding of the weld ring to the body, a braze is created between the tantalum diaphragm and both the stainless steel weld ring and stainless steel body. This braze creates the required hermetic seal between the tantalum diaphragm and the stainless steel body. Additionally, an inert seal is provided between the pressure body of the transducer and the tantalum diaphragm disposed interior of the inner circumference of the stainless steel weld ring whereby process fluids which would otherwise erode the weld ring are isolated therefrom.

3 Claims, 5 Drawing Figures

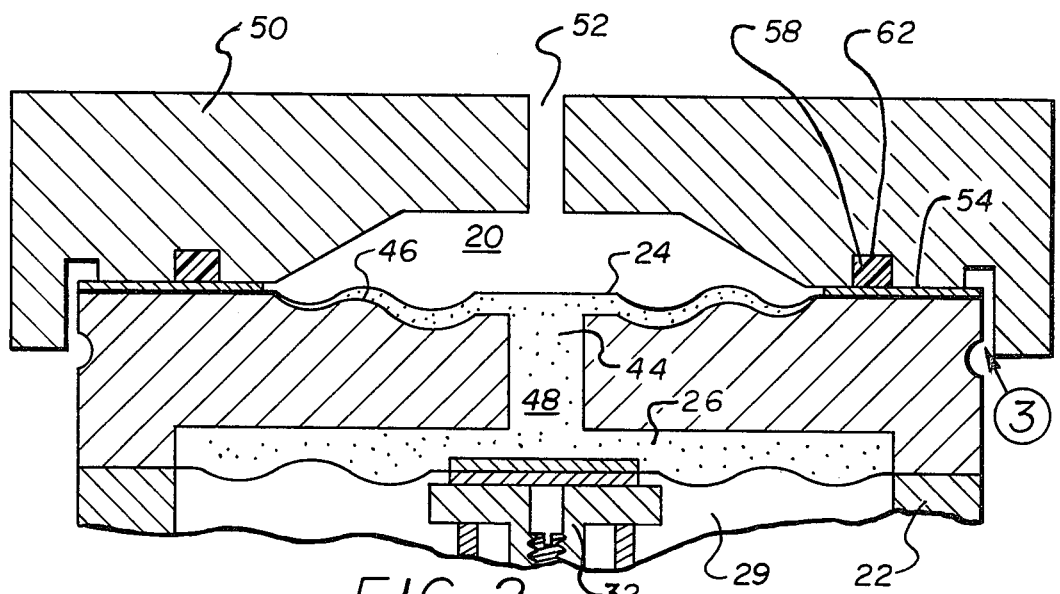
FIG 2 PRIOR ART
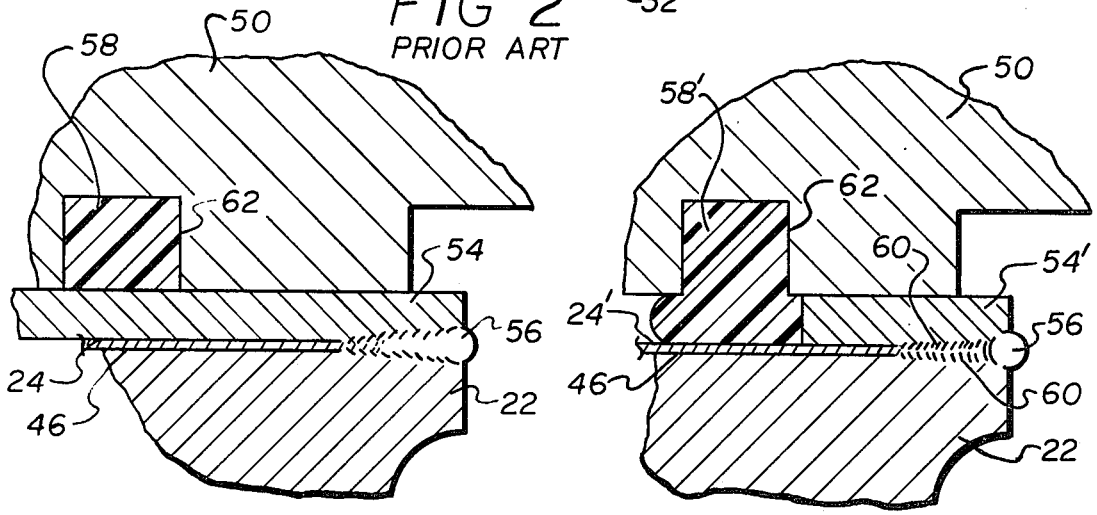
FIG 3 PRIOR ART
FIG 5
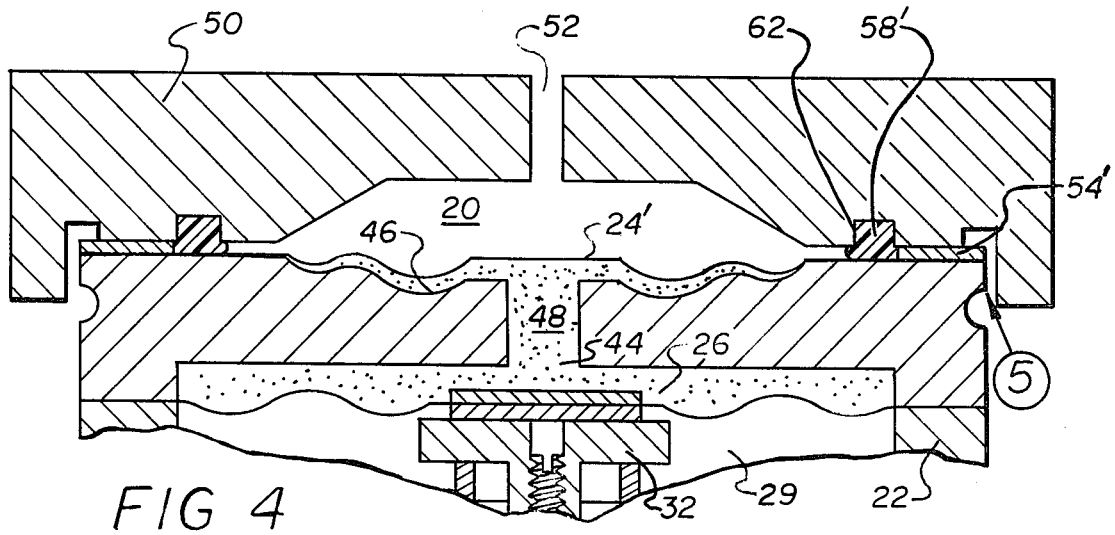
FIG 4

PRESSURE TRANSDUCER WITH WELDED TANTALUM DIAPHRAGM

BACKGROUND OF THE INVENTION

The present invention relates to pressure transducers and more specifically to pressure transducers employed in highly corrosive environments.

A differential pressure transducer as wherein the present invention is applicable is shown in U.S. Pat. No. 3,967,504 to Lloyd T. Akely and assigned to the common assignee of this application. FIG. 1 is a simplified drawing of that apparatus.

FIG. 1 shows a block diagram of a flowmeter installation utilized to measure the flow of process fluid in pipe 10. As used herein, process fluid refers to any fluid, liquid or gases, for which pressure or differential pressure, however generated, is to be measured. The differential pressure in the installation shown in FIG. 1 is developed across a conventional orifice plate 12 so that low pressure is developed in low pressure line 14 and corresponding higher pressure is developed in high pressure line 16. In FIG. 1, the process fluid is assumed to flow from left to right. Line 14 and 16 are connected to a differential pressure transmitter 18 shown in cross-sectional view. The output of transmitter 18 is an electrical signal which may be utilized in many ways, for example, to indicate process fluid flow rate by means of meter 21. Pressure in high pressure line 16 is applied to chamber 20 of transmitter 18 within body 22. The pressure in chamber 20 acts against isolation diaphragm 24 which may be constructed from any conventional material of a sufficiently high flexibility so that the spring rate thereof does not adversely affect the operation of the device. Isolation diaphragm 24 operates a relatively incompressible fill fluid, not shown, within chamber 26. The fluid in chamber 26 acts against sensing diaphragm 28 which is constructed in any conventional manner so that within the operating range of pressures applied to the transmitter its spring rate is linear. The periphery of sensing diaphragm 28, which may be circular, is firmly secured by any conventional mounting means to body 22 as shown. Affixed to the center of sensing diaphragm 28 is central hub 30 which acts against axial hub 32 affixed to the free end of spring member 34. The opposite end of spring member 34 is affixed to body 22 at point 36. Axial hub 32 carries an axial member, such as threaded shaft 38. Movable core or armature 40 is affixed to shaft 38 adjacent the free end thereof and cooperates with stationary cores 42 to form a position transducer. Appropriate electrical means form a signal indicating the relative positions between movable core 40 and stationary cores 42 which signal is indicated in indicator 21.

In a typical pressure transducer according to the prior art, as shown in greater detail in FIGS. 2 and 3, the body 22 is normally of stainless steel. Body 22 contains the chambers 26 and 29 separated by sensing diaphragm 28. Body 22 has a passage 44 communicating with an outer face 46. Isolation diaphragm 24 is disposed over the outer face 46 of body 22. The space between isolation diaphragm 24 and outer face 46 as well as passage 44 and chamber 26 up to sensing diaphragm 28 are filled with a fill fluid 48 such as silicone oil. A pressure body 50 is disposed adjacent isolation diaphragm 24 as shown. Pressure body 50 in conjunction with isolation diaphragm 24 forms chamber 20 having a process connection passage 52 communicating therewith. Process fluid (as from high pressure line 16) to be measured for pressure is introduced into chamber 20 through passage 52 to press on isolation diaphragm 24. To prevent the leakage of fluid 48 after it is in place, isolation diaphragm 24 must be hermetically sealed to body 22. In the standard prior art pressure transducer of FIGS. 2 and 3, this is accomplished by providing a weld ring 54 as shown disposed between isolation diaphragm 24 and pressure body 50 substantially over the entire interface thereof. A weld 56 is then created to bond body 22, isolation diaphragm 24, and weld ring 54 together around the outer periphery of the pressure transducer. An elastomeric seal 58 is then provided between pressure body 50 and weld ring 54 to prevent the leakage of the process fluid from chamber 20 when introduced therein under pressure.

In applications wherein it is desired to make a pressure reading on corrosive fluids, the construction of the prior art, as shown in FIGS. 2 and 3, quickly fails. Typically, in order to provide a response free from influence of the spring rate of the diaphragm, the diaphragms are made quite thin. Consequently, corrosive fluids quickly destroy portions or all of the isolation diaphragm. In many of such applications, it is possible to reduce corrosion of the isolation diaphragm by employing a tantalum diaphragm. However, a method of successfully constructing a pressure transducer employing such a tantalum isolation diaphragm has heretofore evaded accomplishment. Typically, standard isolation diaphragm and weld ring materials are 316 stainless steel, Monel, and Hasteloy C. All of these materials melt at approximately 2500° F and are easily welded to a stainless steel body. Tantalum, however, melts at 5425° F and has a temperature coefficient only about one half that of stainless steel. It is not easily welded to stainless steel parts without cracking and/or formation of brittle tantalum hydrides. The extremely thin tantalum isolation diaphragm required further adds to the problems.

Wherefore, it is the object of the present invention to provide an improved pressure transducer and method of manufacture employing a tantalum isolation diaphragm which can be hermetically sealed to the stainless steel body of the transducer.

SUMMARY

The above object has been accomplished in the present invention by employing a thin stainless steel weld ring only adjacent to the outer periphery of the tantalum isolation diaphragm. The weld ring is welded to the stainless steel body with the tantalum isolation diaphragm therebetween by plasma or Tungsten Inert Gas (TIG) welding methods at a temperature whereby the weld ring and body are welded together while simultaneously creating a braze between the tantalum isolation diaphragm and the stainless steel weld ring and body. In this manner, the tantalum isolation diaphragm is hermetically sealed to the body by the braze. An elastomeric seal is then disposed interior of the weld ring inner circumference between the pressure body and the tantalum isolation diaphragm whereby corrosive process fluids are prevented from coming in contact with and thereby destroying the weld ring.

DESCRIPTION OF THE DRAWINGS

FIG. 2 is a more detailed cross section of the isolation diaphragm area of a pressure transducer according to the prior art.

FIG. 3 is an expanded view of the portion of the outer periphery of the pressure transducer of FIG. 1 indicated by 3 showing the detailed construction of the juncture of the pressure body, weld ring, isolation diaphragm, body, and elastomeric seal.

FIG. 4 is a cross-sectional view of the isolation diaphragm area of a pressure transducer according to the present invention.

FIG. 5 is an expanded drawing in the manner of FIG. 3 showing the construction of the portion indicated by 5 of the pressure transducer of FIG. 4 according to the present invention.

DESCRIPTION OF THE PREFERRED EMBODIMENT

Figure 1:
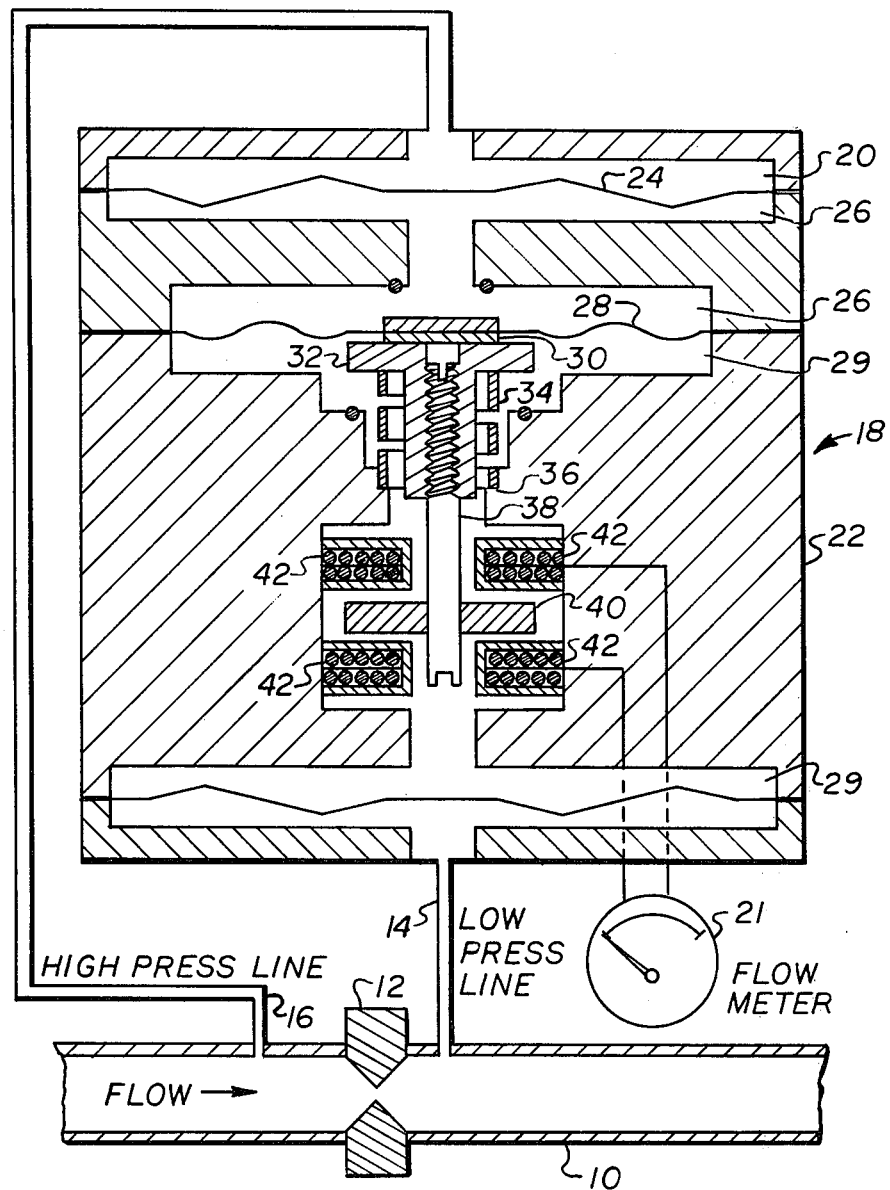
FIG. 1 is a simplified block diagram of a flowmeter installation and cross section through a differential pressure transmitter showing the environment of the present invention.

Referring now to FIGS. 4 and 5, the improved pressure transducer of the present invention according to its preferred embodiment is shown as comprising a body 22 of stainless steel. Body 22 is substantially identical to that of the body 22 of FIG. 2. In a similar manner, a pressure body 50, also of stainless steel, is provided such as that employed in the transducer of FIG. 2. An isolation diaphragm 24' of tantalum is disposed adjacent the outer face 46 of body 22 and a weld ring 54', also of stainless steel, with an increased inner diameter is disposed to be only along the outer periphery of tantalum isolation diaphragm 24'. A source of welding heat, preferably by plasma or TIG means, is applied locally to the extreme outer periphery of tantalum isolation diaphragm 24' at the coincident junction of tantalum isolation diaphragm 24', weld ring 54', and body 22. The temperature of the welding heat should be above the melting temperature of the stainless steel used for weld ring 54' and body 22 whereby a weld 56 along the outer periphery of the aforementioned junction is created. Additionally, the weld temperature should be less than the melting temperature of tantalum but of a sufficient temperature and applied for a sufficient time to create a flow of a portion of the melted steel of weld ring 54' along the surface interface of weld ring 54' and tantalum isolation diaphragm 24' as well as a flow of a portion of the melted steel of body 22 along the interface of outer face 46 of body 22 and tantalum isolation diaphragm 24' whereby the brazed area indicated as 60 is created. The amount of heat and time of application will depend on the size of the pressure transducer being assembled and the welding technique employed. The determination of such parameters is well known to those skilled in the welding art and can be accomplished in standard course without undue experimentation. For example, when employing a 2 mil thick diaphragm and a 20 mil weld ring, the desired weld/braze interface was achieved using TIG welding apparatus set at 18 amps d.c. and 3mm/sec. peripheral speed.

To protect weld ring 54' and seal the process fluid from leaking out of chamber 20, a seal 58' of an elastomeric material, such as polytetrafluoroethylene, inert to the process fluid to be sampled and extending out from pressure body 50 slightly thicker than weld ring 54' is disposed interior of the inner circumference of weld ring 54' and between pressure body 50 and isolation diaphragm 24' in a manner whereby when pressure body 50 is secured close adjacent weld ring 54' by holding means (not shown), the contact of pressure body 50 is against weld ring 54' and, additionally, seal 58' is subjected to a slight deformation whereby a leak-proof seal is created between chamber 20 and weld ring 54' to prevent the corrosive process fluid from leaving chamber 20 to contact weld ring 54'. To maintain seal 58' in position, it is preferred that a retaining groove 62 be provided as shown.

Having thus described my invention, I claim:

1. The method of hermetically sealing a tantalum isolation diaphragm to the stainless steel body of a pressure transducer comprising the steps of:
   a. positioning the tantalum isolation diaphragm adjacent an outer face of the body and in contact therewith around the periphery of the diaphragm;
   b. positioning a stainless steel weld ring against the tantalum isolation diaphragm in contact around the periphery of the diaphragm whereby the outer periphery of the outer face, the diaphragm and weld ring are in coincidence; and,
   c. heating the aforementioned coincident outer periphery to a temperature above the melting point of stainless steel and below the melting point of tantalum whereby the body is welded to the weld ring and the diaphragm is brazed to the body and weld ring.

2. The method of claim 1 and additionally:
   a. positioning a continuous elastomeric seal adjacent the inner periphery of the weld ring; and,
   b. securing a pressure body against the weld ring and elastomeric seal whereby the seal is deformed to create a barrier between process fluids in the transducer and the weld ring.

3. An improved pressure transducer for use with corrosive process fluids comprising:
   a. a stainless steel body containing a chamber and having a passage from said cavity terminating at an outer face;
   b. a position transducer disposed in said chamber;
   c. a tantalum isolation diaphragm disposed adjacent said outer face and in contact around the periphery of said isolation diaphragm, said isolation diaphragm being continuously brazed to said outer face around the periphery of said diaphragm;
   d. fill fluid disposed in said chamber to contact said position transducer, said passage and between said isolation diaphragm and said outer face;
   e. a stainless steel weld ring disposed adjacent said isolation diaphragm and in contact around the periphery of said isolation diaphragm, said weld ring being continuously brazed to said isolation diaphragm and continuously welded to said body around the periphery of said weld ring;
   f. an elastomeric seal disposed continuously around the inner periphery of said weld ring; and,
   g. a stainless steel pressure body disposed and held continuously against said weld ring and said seal whereby said seal is subjected to a deformation force between said isolation diaphragm and said pressure body sufficient to seal the process fluid from contacting said weld ring.

* * * * *